No. 858,548. PATENTED JULY 2, 1907.
J. G. VINCENT.
ADDING MACHINE.
APPLICATION FILED MAR. 21, 1905.

No. 858,548. PATENTED JULY 2, 1907.
J. G. VINCENT.
ADDING MACHINE.
APPLICATION FILED MAR. 21, 1905.

No. 858,548. PATENTED JULY 2, 1907.
J. G. VINCENT.
ADDING MACHINE.
APPLICATION FILED MAR. 21, 1905.

Witnesses
Edw. R. Barrett
Louis B. Erwin

Inventor
J. G. Vincent
By Rector & Hibben
his Atty's

No. 858,548.

PATENTED JULY 2, 1907.

J. G. VINCENT.
ADDING MACHINE.
APPLICATION FILED MAR. 21, 1905.

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

No. 858,548.   Specification of Letters Patent.   Patented July 2, 1907.

Application filed March 21, 1905. Serial No. 251,200.

*To all whom it may concern:*

Be it known that I, JESSE G. VINCENT, a citizen of the United States, residing at Detroit, Wayne county, Michigan, have invented certain new and useful Improvements in Adding-Machines, of which the following is a specification.

My invention relates to power driven operating connections for adding machines and the like in lieu of the manually operated handle ordinarily employed for operating machines of this character, which operating connections are under the direct control of the operator through suitable means, as for instance, a special operating key or button, and, as herein shown, are also under the control of the totalizing and the clearing mechanisms of the adding machine, with the result that the machine may be operated by the act of taking a total or of clearing the machine without operating said special key.

In the present instance, I have shown my invention applied to and incorporated with the well known Burroughs adding machine, constructed and operating substantially as set forth in Letters Patent of the United States, Nos. 504,963, and 505,078, issued on September 12, 1893, on the invention of William S. Burroughs, but it will be understood that my invention is not limited, in its application or scope, to this particular type and construction of machine but that it may be applied to and used in connection with other machines of the same general character and used for the same general purposes.

Inasmuch as the Burroughs adding machine, to which I have chosen to apply my invention for the purpose of affording a clear and comprehensive understanding thereof, is well known both as to construction and mode of operation, only such parts thereof have been illustrated and will be described as are more or less directly concerned with the operating parts or devices constituting my invention.

As is well known, the Burroughs adding machine is provided with a keyboard having a series of keys 291 arranged in rows representing different denominations increasing from right to left, the keys in each row representing the digits 1 to 9. The keyboard is also provided with a total key 265 co-operating with the mechanism of the machine, whereby a grand total or a sub-total may be printed by the machine at the will of the operator. The keyboard may also be provided with special keys, such as an error and repeat key, but such keys perform no special function in the operation of the parts constituting my invention.

The operating parts of the machine are driven by the main operating shaft 300, which as shown is provided with an operating crank 3568 for operating the machine by rocking such shaft against spring pressure tending to hold the main shaft in normal position in the usual and well known manner. This crank which in the present instance points forwardly in the normal condition of the machine is operatively connected at its outer end with the driving connections which are operated by a motor—in the present instance, an electric motor—in the manner hereinafter described.

Figure 2:
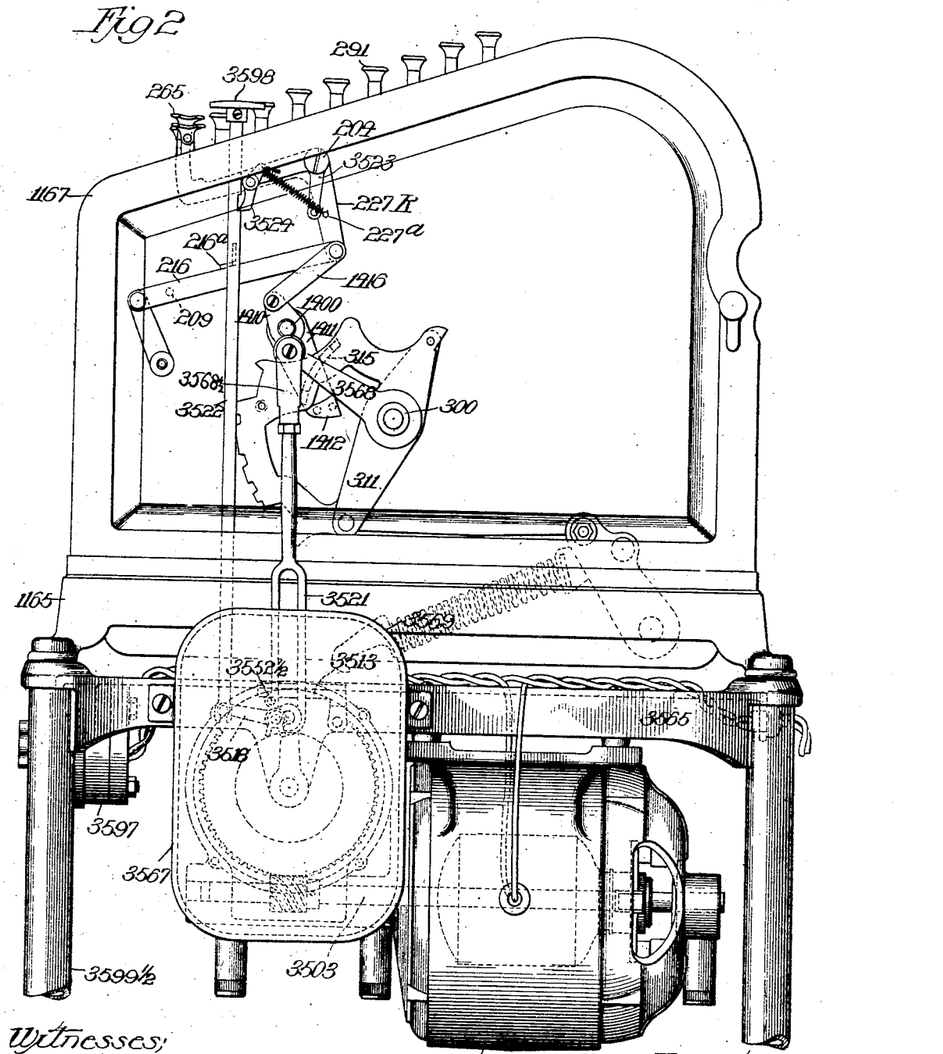
Fig. 2 a side elevation of such machine, operating connections and motor, the view illustrating the left-hand side of the Burroughs machine and, like Fig. 1, illustrating only those parts of the machine which are more or less directly concerned with a proper description and understanding of the features constituting my invention.

As illustrated in Fig. 2, the Burroughs machine is provided with a rock shaft 1400 extending transversely of the machine and rocked in the act of taking a total or of clearing the machine. As herein shown, this shaft is operatively connected with the total key 265, with the result that such shaft is rocked in a clockwise direction whenever the total key is depressed and is restored to normal position when the total key is released. The total key is also operatively connected as usual with a transverse rock shaft 204 which partakes of the same rocking movements as the shaft 1400 in the operation of the total key. On the right-hand side of the machine, as illustrated in Fig. 2, the shaft 1400 is provided with a depending arm 1411 carrying at its lower end a lug 1412 which co-operates with a lug 315 on the sector 311. When the total key is depressed, the depending arm 1411 and its lug 1412 are moved in a clockwise direction and after the main operating shaft 300 has started in its forward or anti-clockwise movement the total key and its connections are kept in operated condition by the engagement of the lug 315, with the lug 1412, it being understood that the sector 311 is secured to and movable with the main shaft 300. The shaft 1400 is also provided with a crank arm 1410, operatively connected with a depending arm 227R by means of a link 1416, the arm 227R being secured to the rock shaft 204 and rocked thereby. The lower end of the arm 227R is also pivotally connected to a link 216 extending forwardly of the machine and provided with the well known universal rod or bar 209, which co-operates with the totalizing mechanism of the machine in the well known way.

Figure 13:
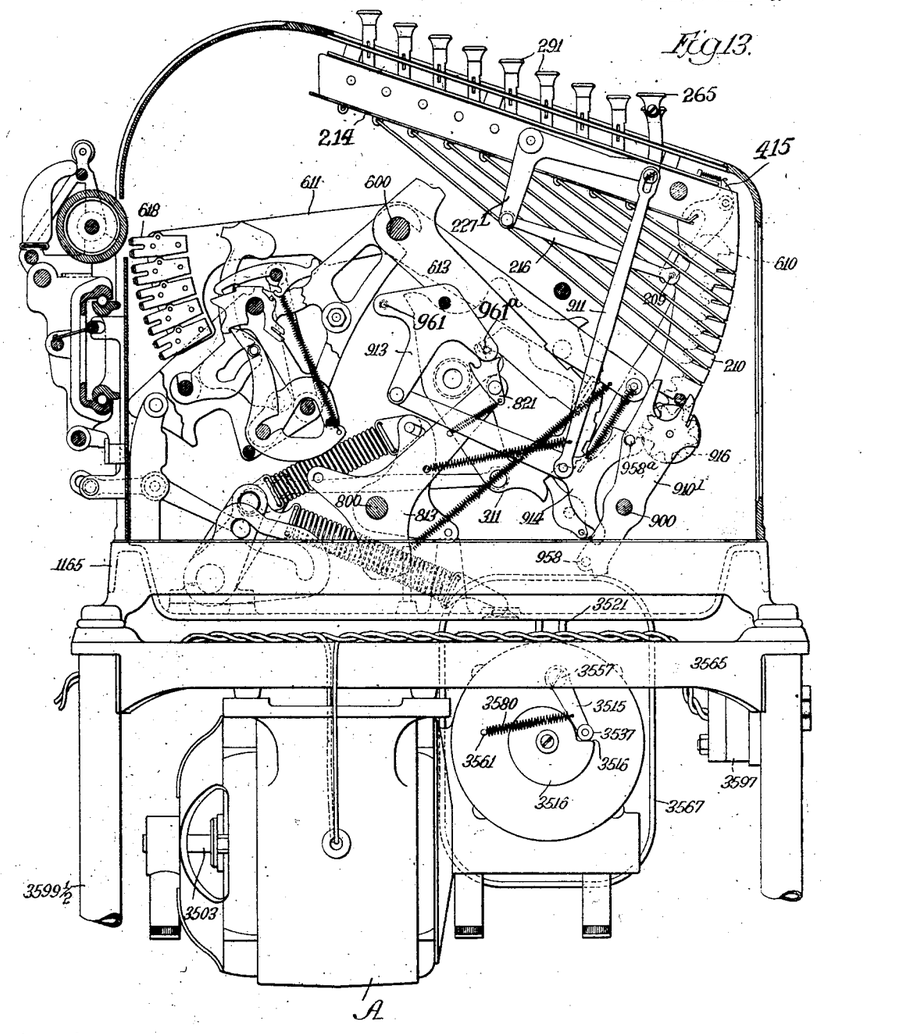
Fig. 13 represents the complete machine in left-side elevation with some parts in section.

The bell crank lever 227L on which the total key or button is mounted has as usual a slot-and-pin connection (see Fig. 13) with a link 911, the latter being connected with the usual pitman 914 for regulating the periods of engagement between the pinions 916 of the accumulator and the actuating racks 610. Said pitman is connected at its rear end with one arm of a three-armed lever 913 carrying studs 961 and 961ᵃ arranged to be alternately operated upon by a wipe-pawl or plate 821. The latter is pivotally mounted upon the upper end of an oscillating arm or lever 813 whose movements accompany that of the operating handle of the machine except that the direction of movement is reversed. The forward end of the pitman is branched for engagement with studs 958 and 958ᵃ on one side plate 910L of the rocking frame in which the accumulator is carried. Normally the upper branch of the pitman engages with the upper stud 958ᵃ, so that reciprocations of the pitman will move the accumulator pinions first out of and then into engagement with the operating rack 610. When the total key 265 is depressed this upper branch of the pitman is disengaged from the stud 958ᵃ so that during the forward stroke of the operating handle the accumulator pinions remain in mesh with the racks. When the handle is moved rearwardly with said key still depressed the lower branch of the pitman acts against the stud 958 and the accumulator pinions are carried out of engagement with their actuating racks in the usual and well-known manner. If a sub-total is desired the total key is released before the operating handle starts on its rearward journey with the result that no action of the pitman against the stud 958 takes place and the accumulator pinions remain in mesh with their actuating racks. The latter are mounted as usual upon the forward ends of the levers 611 independently journaled upon a central cross shaft 600 and carrying at their rear ends sets of type 618, as shown in Fig. 13.

The numeral 613 designates the usual restoring frame or bail which extends under all of the levers 611 and whose retreat, accompanying the forward stroke of the operating handle permits the levers to drop. In itemizing operations they drop distances determined by stops set by depression of amount keys in the customary way. When taking a total of course there is no depression of amount keys. The extent of movement of the racks is then determined by stops which limit backward rotation of the accumulator pinions to positions where zeros show through the accumulator sight openings. In itemizing operations the individual rack latches 415 are displaced by rearward movement of the sliding bars 214 which the amount keys actuate. When a total is to be taken all the latches are simultaneously displaced by the universal rod 209 carried by the links 216, the latter being connected with the arm 227R and the bell crank 227L respectively.

The parts above described, with the exception of the crank 3568, are those which are usual and well known in a Burroughs machine and are the parts with which the power driven operating connections co-operate, or by which said connections are controlled. As hereinafter explained these connections are operated by a suitable motor,—in the present instance, by a continuously running electric motor—which is permitted to transmit its power thereto by a clutch device under the control of the operator, in the manner hereinafter made apparent.

Figures 1, 10, 12:
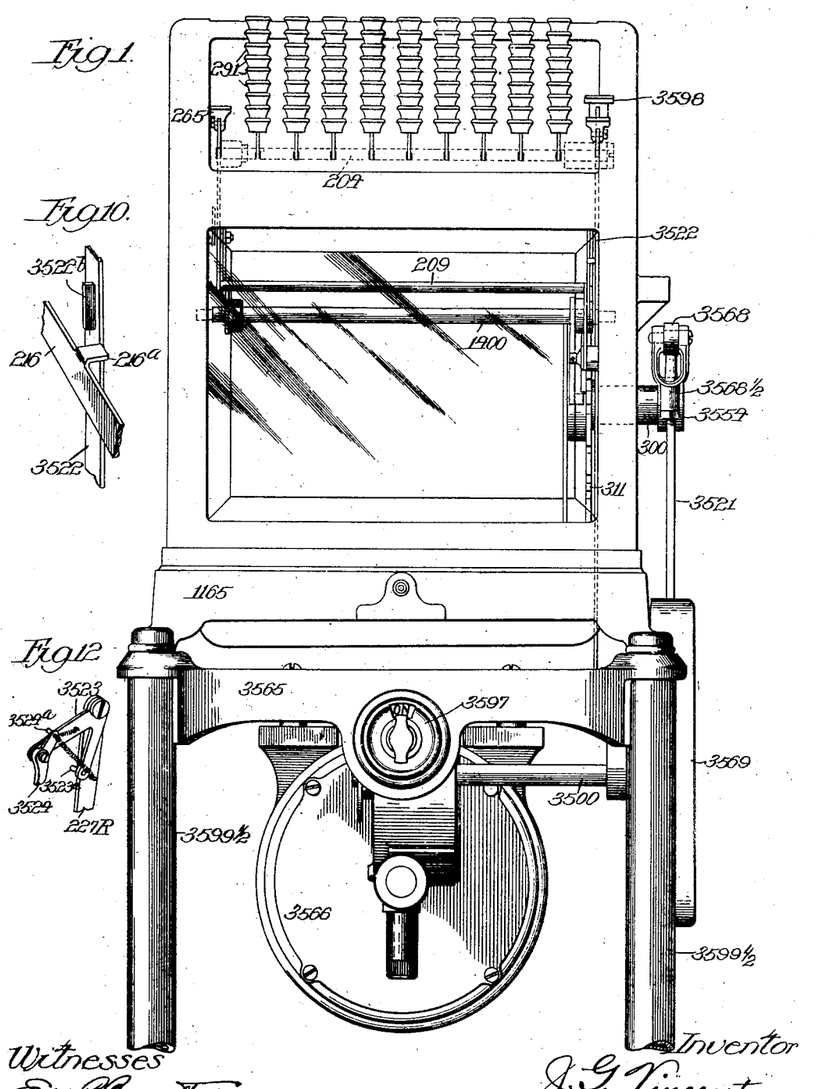
Figure 1 is a front elevation of a Burroughs adding machine with my power driven connections applied thereto—in the present instance driven by an electric motor.
Fig. 10 a perspective of the co-operating portions of the bar or link 216 and the stem of the operating key.
Fig. 12 a detail view of the bell-crank and pawl concerned with the automatic operation of the special key stem 3522.
Figures 3, 4, 5, 9:
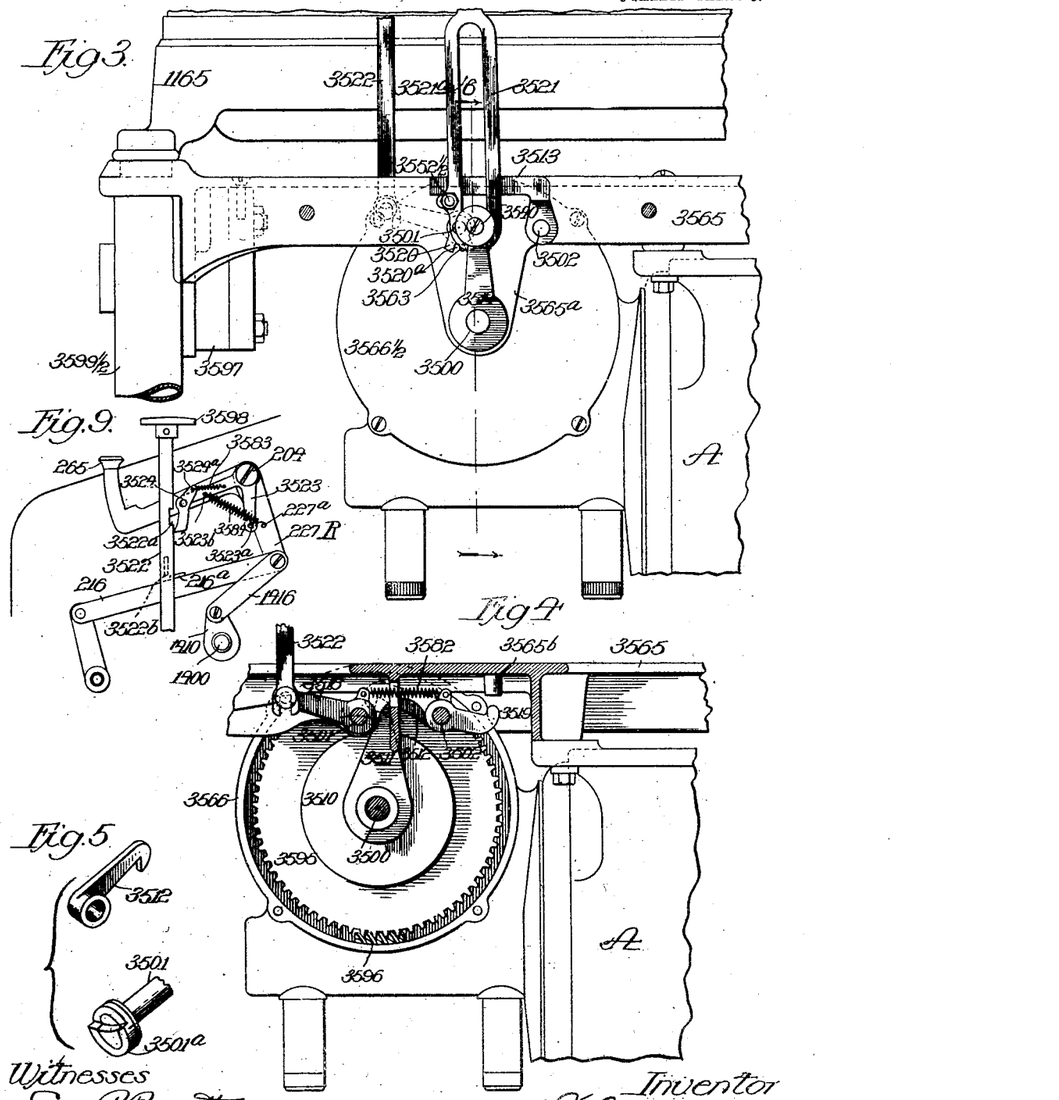
Fig. 3 a side elevation illustrating the driving connections, such view being similar to that of Fig. 2 as to such connections but on a larger scale and with a protecting casing or guard removed.
Fig. 4 a section on the line 4—4 of Fig. 6.
Fig. 5 a perspective of the catches, co-operating with the clutch.
Fig. 9 a detail view showing certain of the parts in operated position.
Figure 6:
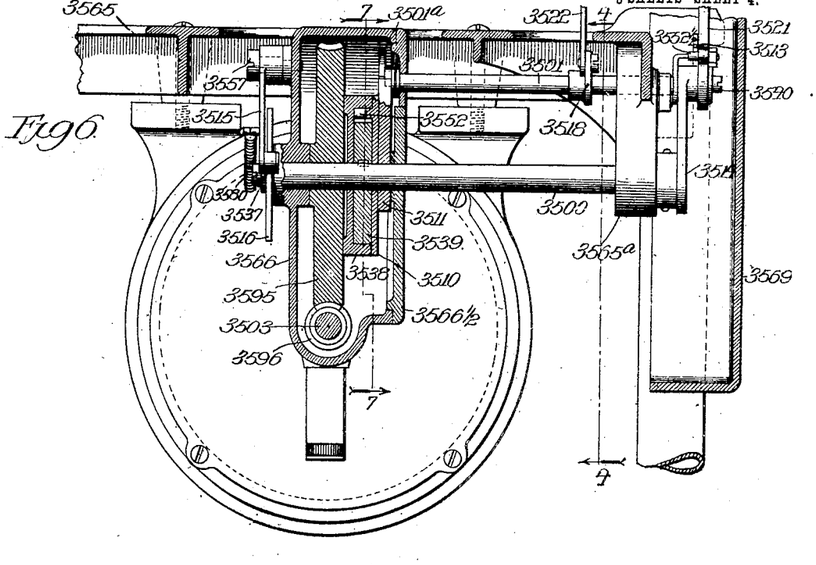
Fig. 6 a section on the line 6—6 of Fig. 3.
Figures 7, 8, 11:
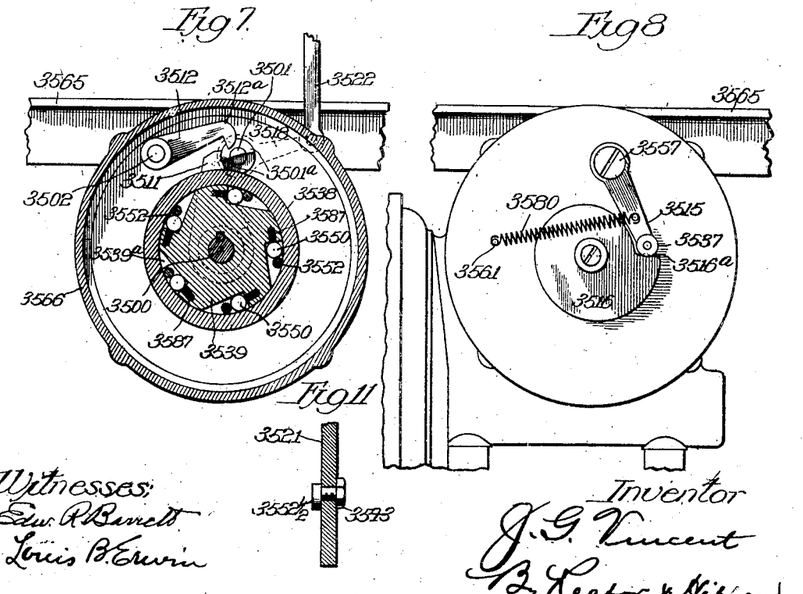
Fig. 7 a section on the line 7—7 of Fig. 6.
Fig. 8 an elevation of the locking device for locking the driven member or the clutch against backward rotation.
Fig. 11 a detail of an adjusting device for timing the operation of the safety catch.

As illustrated in Figs. 1, 2 and 3, the base 1165 of the Burroughs machine rests upon the top of a suitable supporting frame or stand composed, as shown, of legs or standards 3599½ and a top plate or cross frame 3565, which carries or supports the motor and clutch mechanism hereinafter described. The motor A is, in the present instance, an electric motor, of any suitable construction and of a power sufficient for the purposes. The motor, which, as shown, is suspended from the top plate 3565 of the stand in any desired manner, is provided with an extended armature shaft 3503, to which is secured a spiral pinion 3596, Figs. 2 and 6. This pinion engages or meshes with a spiral gear 3595, which is loosely mounted upon a shaft 3500 extending transversely of the machine, Fig. 1, and having at its inner end suitable bearings in the extended casing 3566 of the motor and having at its outer end suitable bearings in the lug 3565ᵃ depending from the top plate 3565, as shown in Figs. 2, 3 and 6. This gear 3595 forms a part of or is connected with the driving member of a clutch but, describing the present construction, such gear has a laterally extending clutch ring 3538, Figs. 6 and 7, forming a shell which is adapted to receive the driven member of the clutch and whose inner face constitutes a clutch face or surface. This driven member, in the present instance, is a disk 3539 which is keyed upon the shaft 3500, but arranged to drive the same when connected with the clutch member or ring 3538 in the manner hereinafter explained, As shown in Fig. 7, the driven member or disk 3539 of the clutch is provided on its margin with a series of re-entrant notches 3539ᵃ, in which are loosely arranged a series of small rollers 3550 normally forced outwardly away from the inner corner of the recesses or notches with a yielding pressure, as by means of the springs 3587. When these rollers are positioned in the corner of the recesses against their spring action, no clutch action exists and the gear 3595 and the driving member or clutch ring 3538 of the clutch operate freely while the driven member or disk 3539 and shaft 3500 are stationary, it being understood that these rollers when permitted to be pressed outwardly by the springs form the connection between the inner face of the clutch ring and the outer face or edges of the recesses in the driven member or disk.

As hereinbefore stated, the motor is a continuously running one and the clutch is normally inoperative, but is rendered operative at the will of the operator for the purpose of rotating the shaft 3500 and thereby driving the crank 3568 of the machine through connections hereinafter described. To this end, the clutch is provided with a circular plate 3510 having a series of inwardly directed pins 3552, which are received by the notches or recesses 3539ª and serve to normally press the rollers 3550 to inoperative position against the tension of their springs, Figs. 6 and 7. This plate 3510 is loosely mounted on the shaft 3500 and is provided with a controlling arm 3511, which may be separate or integral with the plate, but required to be movable therewith. This arm is under the control of catches or latches which, in the present instance, are two in number, by reason of the provision, by preference, of an extra or safety catch in addition to the main catch or latch.

The main catch or latch for the clutch device consists, in the present instance, of a half disk 3501ª, Fig. 6 and 7, secured at the inner end of a transverse shaft 3501 which has its bearings in suitable manner in the top plate 3565 and in the cap plate 3566½ covering the gear case 3566. At a point intermediate its length this shaft is provided with a crank arm 3518 which is spring pressed to the normal position indicated in the drawings by means of a spring 3582 and is operatively connected with an operating key or button under the control of the operator in the manner hereinafter explained. This shaft 3501 is a rock shaft, and, for the purpose of limiting the amount of rocking in both directions, the same is provided at its outer end with a limit plate 3520 having a slot 3520ª, to co-operate with a fixed pin 3563 projecting from the top plate 3565, Figs. 2, 3 and 6. It will be understood that when the crank arm 3518 is rocked in a clockwise direction, Fig. 7, the catch 3501ª which is normally interposed in the path of movement of the arm 3511 and stopped by the left-hand corner of that catch (Fig. 7), will be removed or withdrawn from engagement with the arm 3511, with the result that the pressure of the pins 3552 against the rollers 3550 will be removed and such rollers forced to engaging position by their springs, for the purpose of operatively connecting the driving and driven members of the clutch. The disk 3539 will thereupon be rotated by the clutch ring 3538 and the shaft 3500 to which the former is secured will be rotated or driven in an anti-clockwise direction when viewed as in Fig. 3 or in a clockwise direction when viewed as in Fig. 7. If the catch 3501ª is permitted by the operator to be restored to normal position just after it has released the arm 3511, it will again engage such arm as it completes a single rotation and thereby cause disengagement of the members of the clutch by reason of the action of the pins 3552 upon the rollers 3550 which are thereby forced to inoperative position against the action of their springs. However, for a purpose hereinafter made apparent, an additional or safety catch is provided which, in the present instance, consists of a pivoted arm 3512 secured to a rock shaft 3502 and terminating at its free end in a hook 3512ª, arranged in the path of movement of the outer or free end of the controlling arm 3511. The arrangement and construction of the operating connections is such that after the regular catch 3501ª is released, the safety catch 3512, moves from its normal or inoperative position indicated in Fig. 7 to a position in the path of movement of the arm 3511 and prevents such arm from making more than a single rotation, whatever may be the particular position of the regular catch at the time. The relative arrangement of these two catches is such that the safety catch holds the arm 3511 slightly to the left (Fig. 7) of its position when stopped or engaged by the other or regular latch. Consequently, when the safety catch is released in the automatic manner hereinafter described, the arm 3511 will move a very slight distance before being engaged and retained by the regular catch. While the normal position of the safety catch is the inoperative one illustrated in Fig. 7, yet it is pressed with a yielding pressure toward operative position, and to this end I utilize, in the present instance, the same spring 3582 which serves to hold the other catch 3501ª to its normal position of engagement with the arm 3511, as clearly indicated in Fig 4. As herein shown, the movement of the safety catch to operative position is limited by the contact of a limit arm 3519 against an abutment 3565ᵇ, Fig. 4, said limit arm being secured to the shaft 3502 intermediate its length. For the purpose of securing automatic control of the safety catch, I secure upon the outer end of its shaft 3502 a controlling arm 3513 which is extended to such a position as to be contacted and operated by the connections between the driving shaft 3500 and the operating crank 3568, as hereinafter explained, Fig. 3.

The operating connections between the intermittently driven shaft 3500 and the crank 3568 comprise, in the present instance, a pitman 3521 pivotally connected at its upper end to the outer end of the crank 3568 and provided with an elongated longitudinally extending slot 3521ª adapted to receive the laterally projecting pin or stud 3540 carried by the upper or free end of the crank arm 3514, which is secured at its other end to the shaft 3500. In the present instance, the pitman carries at its upper end an adjustable head 3568½ having forks directly pivoted to the crank 3568 and arranged to screw upon the pitman to obtain the proper length of the connection between the cranks 3514 and 3568. A lock nut 3554 holds these parts in fixed position. The pitman 3521 is provided near its lower end with an inwardly extending projection or pin 3552½, which is adapted to contact the arm 3513 and, when the machine is in normal position, to hold such arm in a slightly elevated position, with the result that the safety catch will be held to its inoperative or normal position, as indicated in Fig. 7. This forms the automatic control of the safety catch above referred to.

If desired, means may be provided for regulating the time when the safety catch will permit the release of the arm 3511 and this may be conveniently done by varying or adjusting the relative positions or time of co-operation of the controlling arm 3513 of the safety catch and the contact pin 3563. In the present instance, I accomplish this result by making the pin itself adjustable, to which end, as seen in Figs. 3 and 11, I provide the pin proper with a head 3543 eccentric thereto and adjustable rotarily in a hole in the pitman 3521. In other words the contact pin is eccentric to the axis on which the head thereof turns, with the result that the position of the pin may be adjusted relatively to the controlling arm 3513 so that the safety catch may be released or removed from operative position earlier or later as required or desired.

It will be understood from the foregoing description that the engagement and disengagement of the clutch members and the consequent intermittent rotation of the shaft 3500 is under the control of the catch 3501ª and that upon a slight rocking of the shaft 3501 which carries the same, the said shaft 3500 will be rotated. The rocking of the shaft 3501 and the consequent disengagement of the catch 3501ª is itself under the direct control of the operator and also under the control of the totalizing and clearing mechanisms, as hereinafter explained.
To this end, a vertical operating rod or key stem 3522 is, in the present instance, extended along the right-hand side of the machine, through its base, and pivotally connected at its lower end to the crank arm 3518 hereinbefore described. The upper end of this operating key stem is extended through the keyboard of the machine and terminates in a preferably enlarged operating key or button 3598. It is evident that whenever the operating key 3598 is depressed by the operator the catch 3501ª will be disengaged from the arm 3511 and the clutch thereby permitted to rotate the shaft 3500, with the result that the pitman 3521 will first be drawn downwardly and the main shaft 300 of the machine rocked in an anti-clockwise direction (Fig. 2) and such pitman will be permitted to rise and thereby return to normal position independently of and slower than the shaft 3500, by reason of the pin and slot connection between it and the crank arm 3514. It will be understood that the driving connections operate simply to rock the shaft 300 on its forward stroke and that such shaft, as well as the crank arm 3568 and the pitman are returned to their normal position by reason of the spring tension always exerted on the shaft 300, this return movement being, in the present instance, slower than the latter half of the rotation of the crank arm 3514 and its shaft 3500. Thus the driving connections operate the machine in a positive manner on the forward stroke or movement of the main shaft 300 and permit such shaft to return in the manner usual in a Burroughs machine, for instance.
As hereinbefore stated, the safety catch is held to inoperative position when the pitman is in its normal position, as indicated in Figs. 2 and 3, but, as will be observed, such safety catch is permitted to be pressed by its spring to an operative position upon the first movement of the shaft 3500 and the pitman 3521 and such safety catch will remain in such operative position ready to catch and hold the arm 3511 against more than a single revolution until the pitman returns to its normal position, whereupon the safety catch will be rocked to inoperative position and the arm 3511 will be caught and engaged by the regular catch 3501ª. The purpose of the safety catch is to prevent continued rotation of the shaft 3500 in the event that the adding machine or any of the operating connections should become locked and the pitman should fail to be returned to normal position, or in the event that the operator should keep the operating key depressed, in which case the safety catch, having control of the clutch, will prevent the shaft 3500 from being rotated until after the adding machine has completed its operation and until it is ready for the next item. Under no condition therefore can the shaft 3500 move more than a single rotation unless and until the adding machine returns to normal position and, whatever may be the speed of the motor and of said shaft, the machine cannot be operated any faster than permitted by the usual dash-pot and the springs which are operatively connected with the shaft 300 of a Burroughs machine.

By preference, I provide suitable means for preventing backward movement of the shaft 3500, such means comprising, in the present instance and as illustrated in Figs. 6 and 8, a cam plate 3516 secured to such shaft at its left-hand end (Fig. 6) at a point outside of the gear case 3566, which cam plate co-operates with a pivoted detent 3515 in such manner as to move in a clockwise direction when viewed as in Fig. 8, but prevent opposite rotation after such shaft has completed a rotation. This detent is pivoted at its upper end to a stud 3557 on the side of the gear case and is provided at its lower end with an anti-friction roller 3537 which bears against the cam surface or edge of the cam plate. When the shaft 3500 is rotated the cam forces the detent outwardly against the tension of its spring 3580 until the abrupt shoulder 3516ª is presented to the roller 3537, whereupon such roller and its detent will snap inwardly to the position indicated in Fig. 8, at which time the shaft 3500 has been rotated once and been caught by the safety catch hereinbefore referred to. By the provision of this locking mechanism the shaft 3500 is kept from moving backwardly, and continued engaging and disengaging action or fluttering of the clutch is thereby prevented.

As herein illustrated, I provide suitable connections with the totalizing and clearing mechanisms for the purpose of operating the machine by the act of the operator in bringing the totalizing or the clearing mechanisms into position for action. In the present instance, this result is obtained by simply depressing the total key and operating its connections without manually actuating the operating key or button. Referring to the construction herein shown, I take advantage of the longitudinal or reciprocating movement of the bar or link 216, which is always moved rearwardly of the machine when the total key or button is depressed and is permitted to move forwardly, that is to return to normal position, when the total key or button is restored to normal position and I also utilize the swinging movement of the depending arm 227R. As clearly indicated in Figs. 9 and 10, I pivot upon the shaft 204 a bell crank 3523, on whose forwardly directed arm is pivotally mounted a pawl 3524, whose free end or tooth is arranged in proximity to the key stem 3522 and is adapted to co-operate with a notch 3522ª cut in the rearward edge thereof. This pawl is normally spring pressed so as to be presented to such edge of the operating rod by means of a small spring 3583, fastened at one end to a stud 3524ª on the tail of the pawl 3524 and at its other end to the upper arm of the bell-crank. The stud or pin 3524ª is extended so as to project inwardly of the pawl (Fig. 12) and to bear against the top edge of the upper arm of the bell-crank, limiting the pivotal movement of such pawl for a reason hereinafter explained. The lower end of the depending arm of the bell-crank 3524 is provided with an inwardly extending pin or stud 3523ª, which is arranged to co-operate with the forward edge of the arm 227R in such manner as to be limited thereby in its rearward movement and to be restored to normal position upon the return or forward swinging movement of such arm 227R. The bell-crank is held to normal position with its stud 3523ª against the arm 227R as described, with a yielding pressure, as by means of the spring 3584 fastened at one end to the stud 3523ᵇ and at its other end to a stud 227ª on the arm 227R. The pawl 3524 normally bears as to its forward end or tooth in the notch 3522ª, such tooth being in position to contact the lower shoulder or end of such recess, as indicated in Fig. 2. It is evident that when the total key is depressed and the depending arm 227R thereby rocked rearwardly, that is to the right in Fig. 2, the spring 3584 will tend to draw the forwardly extending arm of the bell-crank 3523 downwardly, together with the pawl 3524. This would result in depressing the key stem 3522 in the same manner as if depressed by the operator were it not for the fact that means are provided for restraining such operation of the key stem and likewise restraining the downward movement or rocking of the bell-crank by the spring which, in the described movement of the arm 227R, is simply distended so as to put the bell-crank under tension to rock downwardly whenever permitted to do so by the release of the key stem. In the present instance, the means for thus momentarily locking or restraining the key stem upon the initial depression of the total key or button and until the latter has about reached the limit of its downward movement, comprise an interference between such stem and the reciprocating link or bar 216. This interference consists of a projection or lug 216ª extending outwardly toward the inner side or face of the key stem and normally positioned out of the path of movement of a projection or lug 3522ᵇ extending inwardly from the key stem.

It is evident that upon the initial movement of the total key the link 216 will be moved longitudinally to the right (Fig. 2), with the result that its lug 216ª will be moved into the path of the lug 3522ª and thereby prevent the depression of the key stem until such link 216 has been moved sufficiently to the right to permit the lug 3522ª to clear the forward end of the lug 216ª, at which time the totalizing and the clearing mechanisms have been fully brought into operative position, whereupon the key stem will be forced downwardly with rapidity and will be restored also with rapidity, the pawl being swung sufficiently to the right (Fig. 2) to escape the lower shoulder in the notch of the stem. It will be understood that inasmuch as the movement of the pawl 3524 is limited by the stud 3524ª as to the forward movement of its lower end or tooth, such tooth is compelled to move in the arc of a circle described from the axis of shaft 204 as a center and is thereby enabled to free itself from the notch of the key stem when the bell-crank is sufficiently rocked. This rapid reciprocation or operation of the key stem takes place just as the total key or button reaches the lower limit of its depression, at which time the parts of the machine are ready either for the totalizing operation (a sub-total or grand total) or for a clearing operation, it being understood that this operation of the operating key by means of the total key or button and its connections is the same, in result, as the preliminary depression of the total button and the immediate or subsequent manual operation or depression of the operating key, but such automatic operation of the machine in taking a total or in clearing thus dispenses with the double operation of manually depressing the total button and the operating key. Thus a total may be taken or printed or the machine may be cleared with one hand by simply depressing the total key or button, instead of using both hands one to depress the total button and the other to depress the operating key. It will be understood that when a sub-total is to be taken or printed the total button is permitted to ascend at the end of the downward stroke of the crank arm 3568, while a grand total is taken by keeping the total button depressed through a full movement of the operating parts of the adding machine.

The motor and clutch, together with the operating connections are compactly arranged in connection with and supported by the stand or frame, on which the adding machine is mounted as clearly indicated in Figs. 1 and 2 and in order to shield or guard the operating connections at the lower end of the pitman, I prefer to attach a plate or casing 3569, as indicated in Figs. 1, 2 and 6.

The motor in the present instance is an electric motor which may be operated by any available current of electricity, such as that for ordinary incandescent lighting, for which purpose a cable and socket is provided for leading the current to the motor, such current being preferably under the control of a switch at the machine itself, such as the ordinary snap switch 3697 mounted at the front of the stand or frame and preferably having means for indicating whether the current is turned "on" or "off", Fig. 2.

I claim:

1. The combination, with an operating rock shaft, of a continuously running motor, and means connecting the same with said rock shaft for causing the motor to positively rock the shaft in one direction and leave it free to be returned by independent means; substantially as described.

2. The combination, with an operating rock shaft and resetting spring therefor, of a continuously running motor, and means connecting the same with said rock shaft for causing the motor to positively rock the shaft in one direction and permit it to be returned to normal position by the resetting spring; substantially as described.

3. The combination, with an operating rock shaft, of a continuously running motor, and means under the control of the operator for connecting the motor with said rock shaft for causing the motor to positively rock the shaft in one direction and leave it free to return itself to normal position; substantially as described.

4. The combination, with an operating rock shaft, of a continuously running motor, and key controlled means for connecting the motor with said rock shaft for causing the motor to positively rock the shaft in one direction and leave it free to return itself to normal position; substantially as described.

5. The combination, with an operating rock shaft and resetting spring therefor, of a continuously running motor, a clutch co-operating with the motor, and means connecting the clutch with said rock shaft for positively rocking the shaft in one direction and permitting it to be returned to normal position by the resetting spring; substantially as described.

6. The combination, with an operating rock shaft and resetting spring therefor, of a continuously running motor, a clutch co-operating with the motor, and means under the control of the operator for connecting the clutch with said rock shaft for positively rocking the shaft in one direction and permitting it to be returned to normal position by the resetting spring; substantially as described.

7. The combination, with an operating rock shaft, and resetting spring therefor, a continuously running motor, a clutch co-operating with the motor, and key-controlled means connecting the clutch with said rock shaft for positively rocking the shaft in one direction and permitting it to be returned to normal position by the resetting spring; substantially as described.

8. The combination with a spring pressed operating shaft adapted to be positively rocked in one direction and to be restored by its spring to normal position, of a continuously running motor, clutch mechanism co-operating with the motor, an operating connection between such clutch mechanism and the shaft for so positively rocking the same, but permitting it to be returned by its own tension, and means under the control of the operator for operating the clutch mechanism; substantially as described.

9. The combination with a spring pressed operating shaft adapted to be positively rocked in one direction and to be restored by its spring to normal position, of a continuously running motor, clutch mechanism co-operating with the motor, an operating connection between such clutch mechanism and the shaft for so positively rocking the same but permitting it to be returned by its own tension, and key-controlled means for operating the clutch mechanism; substantially as described.

10. The combination, with an operating rock shaft and resetting spring therefor, of a continuously running motor, a clutch co-operating with the motor, a crank arm operated by the clutch, and a pitman operatively connected with said rock shaft and having a pin and slot connection with said crank arm for causing the rock shaft to be positively rocked in one direction and to be restored by its resetting spring; substantially as described.

11. The combination, with an operating rock shaft and resetting spring therefor, of a continuously running motor, a clutch co-operating with the motor, a crank arm operated by the clutch, a pitman operatively connected with said rock shaft and having a pin and slot connection with said crank arm for causing the rock shaft to be positively rocked in one direction and to be restored by its resetting spring and means for controlling the clutch at the will of the operator; substantially as described.

12. The combination, with an operating shaft, of a continuously running motor, a crank arm connected with such shaft, a second crank arm, clutch mechanism between the motor and second crank arm, a slotted pitman connecting said crank arms, and means for causing engagement and disengagement of the clutch mechanism at the will of the operator; substantially as described.

13. The combination, with an operating shaft, of a continuously running motor, a crank arm connected with such shaft, a second crank arm, clutch mechanism between the motor and second crank arm, a slotted pitman connecting said crank arms, and key-controlled means for causing engagement and disengagement of the clutch mechanism at the will of the operator; substantially as described.

14. In a machine of the character described, the combination, with a continuously running motor, and with the main shaft of the machine, of a crank arm connected with such shaft, a second crank arm, clutch mechanism between the motor and second crank arm, a connection between said crank arms for rocking the main shaft in one direction but permitting it to restore itself to normal position, and means under the control of the operator for operating the clutch mechanism; substantially as described.

15. In a machine of the character described, the combination, with a continuously running motor and with the main shaft of the machine, of a crank arm connected with such shaft, a second crank arm, clutch mechanism between the motor and second crank arm, said second crank having a crank pin, a slotted pitman pivoted at one end of the first crank arm and having a longitudinal slot at its other end to receive said crank pin, and means under the control of the operator for operating the clutch mechanism; substantially as described.

16. The combination, with an operating rock shaft, of a continuously running motor, operating means connecting the same with said rock shaft for causing the motor to positively rock the shaft in one direction only and leave it free to be independently returned, and means for preventing a second operation of said operating means until the rock shaft has been restored to normal position; substantially as described.

17. The combination with an operating rock shaft, of a continuously running motor, operating connections between the motor and rock shaft for causing the motor to positively rock the shaft in one direction and permit it to be independently returned, and means for preventing a second operation of said connections until the rock shaft has been restored to normal position; substantially as described.

18. The combination, with an operating rock shaft, of a continuously running motor, operating connections between the motor and rock shaft for causing the motor to positively rock shaft in one direction and permit it to be independently returned, key mechanism for controlling such connections, and means for preventing a second operation of said connections until the rock shaft has been restored to normal position; substantially as described.

19. The combination with an operating rock shaft, of a continuously running motor, operating connections between the motor and rock shaft for causing the motor to positively rock the shaft in one direction and permit it to be independently returned, key mechanism for controlling such connections, and means independent of the key mechanism for preventing a second operation of said connections until the rock shaft has been restored to normal position; substantially as described.

20. The combination, with an operating rock shaft, of a continuously running motor, operating connections between the motor and rock shaft for causing the motor to positively rock the shaft in one direction and permit it to be independently returned, and means under the control of said connections for preventing a second operation thereof until the rock shaft has been restored to normal position; substantially as described.

21. The combination, with an operating rock shaft, of a continuously running motor, operating connections between the motor and rock shaft for causing the motor to positively rock the shaft in one direction and permit it to be independently returned, key mechanism for controlling the operation of such connections, and means operating independent of the key mechanism and under the control of said connections for preventing a second operation thereof until the rock shaft has been restored to normal position; substantially as described.

22. The combination, with an operating rock shaft, of a continuously running motor, a clutch operatively connected therewith and with said rock shaft, means under the control of the operator for controlling the action of the clutch, and means for preventing a second operation of the clutch until the rock shaft has been restored to normal position with provisions for permitting such second operation while the said controlling means remains out of normal; substantially as described.

23. The combination, with an operating rock shaft, of a motor, a clutch operatively connected therewith and with said rock shaft, key-actuated means for controlling the action of the clutch, and means for preventing a second operation of the clutch until the rock shaft has been restored to normal position with provisions for permitting such second operation while the said controlling means remains out of normal; substantially as described.

24. The combination, with an operating rock shaft, of a motor, a clutch operatively connected therewith and with said rock shaft, means under the control of the operator for controlling the action of the clutch, and means automatically controlled in the restoration of the rock shaft for preventing a second operation of the clutch until the rock shaft has been restored to normal position with provisions for permitting such second operation while the said controlling means remains out of normal; substantially as described.

25. In a machine of the character described, the combination with a motor, and with the main operating shaft of the machine, of a clutch device comprising a driving member operated by the motor, a driven member operatively connected with the main shaft of the machine, means co-operating with the driven member and under the control of the operator for controlling the clutching action thereof, and means for preventing such action until the main operating shaft of the machine has been restored to normal position after an operation with provisions for permitting such second operation while the said controlling means remains out of normal; substantially as described.

26. In a machine of the character described, the combination with a motor and with the main operating shaft of the machine, of a clutch device comprising a driving member operated by the motor, a driven member operatively connected with the main shaft of the machine, key-actuated means co-operating with the driven member for controlling the clutch action, and means for preventing such action until the main operating shaft of the machine has been restored to normal position after an operation with provisions for permitting such second operation while the said controlling means remains out of normal; substantially as described.

27. In a machine of the character described, the combination, with a motor and with the main operating shaft of the machine, of a clutch having operating connections with said motor and with the main shaft, means under the operator's control for controlling the action of the clutch, and means for preventing clutching action until the main operating shaft of the machine has been restored to normal condition after an operation with provisions for permitting such second operation while the said controlling means remains out of normal; substantially as described.

28. In a machine of the character described, the combination, with a motor and with the main operating shaft of the machine, of a clutch having operating connections with said motor and with the main shaft, means under the operator's control for controlling the action of the clutch, and means, actuated by operating connection between said clutch and shaft for preventing clutch action until the main operating shaft of the machine has been restored to normal condition after an operation; substantially as described.

29. In a machine of the character described, the combination, with a motor and with the main operating shaft of the machine, of a clutch having operating connections with said motor and with the main shaft, said clutch normally tending to operative condition, means under the operator's control for restraining clutching action, and secondary means also for restraining such action until the main operating shaft of the machine has been restored to normal condition after an operation; substantially as described.

30. In a machine of the character described, the combination, with a motor and with the main operating shaft of the machine, of a clutch having operating connections with said motor and with the main shaft, said clutch normally tending to operative condition, key-controlled mechanism for restraining clutching action, and secondary means under the control of the operating connections between the clutch and main shaft for independently restraining such clutching action until the main operating shaft of the machine has been restored to normal condition after an operation; substantially as described.

31. In a machine of the character described, the combination, with a motor and with the main operating shaft of the machine, of a clutch comprising a driving member operated by the motor, a driven member adapted to be put in engagement with the driving member at the will of the operator, operating connections between the driven member of the clutch and the main shaft of the machine, a safety catch device co-operating with said driven member and tending to prevent its operation, and a catch device under the control of the operator for normally preventing engagement between said members; substantially as described.

32. In a machine of the character described, the combination with a motor and with the main operating shaft of the machine, of a clutch comprising a driving member operated by the motor, a driven member adapted to be put in engagement with the driving member at the will of the operator, operating connections between the driven member of the clutch and the main shaft of the machine, a safety catch device controlled by said operating connections and tending to prevent the operation of the driven member but restrain by such connections when the latter are in normal position, and a catch device under the control of the operator for normally preventing engagement of said clutch members but adapted to be released to cause an operation of the machine; substantially as described.

33. In a machine of the character described, the combination, with a motor and with the main operating shaft of the machine, of a clutch comprising a driving member operated by the motor, a driven member adapted to be put in engagement with the driving member at the will of the operator, operating connections between the driven member of the clutch and the main shaft of the adding machine, means for controlling the operation of the clutch device at the will of the operator, and means for preventing operation of the clutch until the said main operating shaft of the machine has been restored to normal position after an operation; substantially as described.

34. In a machine of the character described, the combination, with a motor and with the main operating shaft of the machine, of a clutch comprising a driving member operated by the motor, a driven member adapted to be put in engagement with the driving member at the will of the operator, operating connections between the driven member of the clutch and the main shaft of the adding machine, means for controlling the operation of the clutch at the will of the operator, and means under the control of said operating connections for preventing operation of the clutch device until the said main operating shaft of the machine has been restored to normal position after an operation; substantially as described.

35. In a machine of the character described, the combination, with a motor and with the main operating shaft of the machine, of a clutch comprising a driving member operated by the motor, a driven member adapted to be put in engagement with the driving member at the will of the operator, operating connections between the driven member of the clutch and the main shaft of the adding machine, a safety catch co-operating with said driven member and tending to prevent its operation, a projection on one of said operating connections for interfering with such catch and rendering the same inoperative when such connections are in normal position, and means under the control of the operator for operating the clutch; substantially as described.

36. In a machine of the character described, the combination with a motor and with the main operating shaft of the machine, of a clutch comprising a driving member operated by the motor, a driven member adapted to be put in engagement with the driving member at the will of the operator, operating connections between the driven member of the clutch and the main shaft of the adding machine comprising a pitman operatively connected at its ends respectively with the main shaft of the machine and with the driven member of the clutch, a safety catch co-operating with said driven member but tending to prevent its operation and controlled by said pitman, and means under the control of the operator for operating the clutch device; substantially as described.

37. In a machine of the character described, the combination, with a motor and with the main operating shaft of the machine, of a clutch device comprising a driving member operated by the motor, a driven member adapted to be put in engagement with the driving member at the will of the operator, operating connections between the driven member of the clutch and the main shaft of the adding machine comprising a pitman operatively connected at its ends respectively with the main shaft of the machine and with the driven member of the clutch device, a safety catch co-operating with said driven member but tending to prevent its operation, said pitman having a pin adapted when the pitman is in restored or normal position to engage said catch and render it inoperative, and means under the control of the operator for operating the clutch device; substantially as described.

38. In a machine of the character described, the combination, with a motor and with the main operating shaft of the machine, of a clutch device comprising a driving and a driven member tending at all times to engage means under the control of the operator for normally preventing said engaging action and capable of being held displaced during an operation of the machine, and operating connections between the driven member and the main shaft of the machine; substantially as described.

39. In a machine of the character described, the combination, with a motor and with the main operating shaft of the machine, of a clutch device comprising a driving and a driven member tending at all times to engage each other, an arm under the control of the operator for governing said engaging action, said arm being concentric with the clutch members and operating connections between the driven member and the main shaft of the machine; substantially as described.

40. In power operated driving conections for adding machines and the like, the combination, with a motor and with the main operating shaft of the adding machine, of a clutch device comprising a driving and a driven member tending at all times to engage each other, a plate for controlling such clutching action, an arm rigid on said plate, and a catch under the control of the operator for engaging said arm and thereby preventing clutching action, and operating connections between said driven member of the clutch and the main shaft of the machine; substantially as described.

41. In a machine of the character described, the combination, with a motor and with the main operating shaft of the machine, of a clutch device comprising a driving and a driven member tending at all times to engage each other, a plate or disk for controlling such clutching action, a driven shaft connected with the driven member, operating connections between said driven shaft and main shaft of the machine, a catch device under the operator's control for engaging said plate or disk and thereby preventing clutching action, and a second or safety catch for preventing the operation of such plate until said main operating shaft of the machine has been restored to normal position after an operation; substantially as described.

42. In a machine of the character described, the combination, with a motor and with the main operating shaft of the machine, of a clutch device, comprising a driving and a driven member tending at all times to engage each other, a plate for controlling such clutching action, a driven shaft connected with the driven member of the clutch, operating connections between said driven shaft and main shaft of the machine, an arm on such plate, a pivoted catch normally engaging said arm to prevent clutching action and an operating rod under the operator's control for releasing the catch and thereby causing an operation of the machine; substantially as described.

43. In a machine of the character described, the combination with a motor and with the main operating shaft of the machine, of a clutch device comprising a driving and a driven member tending at all times to engage each other, a plate for controlling such clutching action, a driven shaft connected with said driven member, operating connections between said driven shaft and main shaft of the machine, an arm on such plate, a catch under the operator's control for engaging said arm and thereby preventing clutch action, and a second or safety catch arranged in advance of the first named catch engaging said arm to prevent clutching action until the machine has been restored to normal position after an operation; substantially as described.

44. In a machine of the character described, the combination with a motor and with the main operating shaft of the machine, of a clutch device comprising a driving and a driven member tending at all times to engage each other, a plate for controlling such clutching action, a driven shaft connected with said driven member, operating connections between said driven shaft and main shaft of the machine, an arm on such plate, a catch normally spring pressed into the path of said arm to restrain it and adapted to be released by the operator, and a second or safety catch also arranged in the path of the arm to engage it and located in advance of the first named catch, said safety catch being normally spring pressed into such engaging position but held therefrom in the normal or restored position of the operating connections; substantially as described.

45. In a machine of the character described, the combination with a motor and with the main operating shaft of the machine, of a clutch device comprising a driving and a driven member tending at all times to engage each other, a plate for controlling such clutching action, a driven shaft connected with said driven member, operating connections between said driven shaft and main shaft of the machine, an arm on such plate, a key-controlled catch normally pressed into the path of said arm to release it and prevent clutching action, and a second or safety catch arranged in advance of the first named catch to engage said arm; substantially as described.

46. In a machine of the character described, the combination with a motor and spring pressed operating rock shaft adapted to be positively rocked in one direction to operate such machine and to be restored by its spring tension to return the parts of the machine to normal position, of a driving shaft operatively connected with the rock shaft of the machine to impart a movement thereto in one direction only, a clutch operatively connected with the motor and with the driving shaft and arranged to impart one rotation at a time to such latter shaft, and means for controlling the clutch at the will of the operator; substantially as described.

47. In a machine of the character described, the combination with a motor and spring pressed operating rock shaft adapted to be positively rocked in one direction to operate such machine and to be restored by its spring tension to return the parts of the machine to normal position, of a clutch device operatively connected with the motor, and a driving shaft operated by the clutch device one rotation at a time and operatively connected with the rock shaft of the adding machine to positively rock the same during the first half of its rotation and to be operatively disconnected therefrom for the remainder of the rotation; substantially as described.

48. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein, normally tending to form clutch connection between said members, means under the control of the operator for normally restraining said action of the rollers, and operating connections between the clutch disk and the main shaft of the machine; substantially as described.

49. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein, normally held with a yielding pressure toward a position for clutching connection between said members, means under the control of the operator for normally restraining said action of the rollers, and operating connections between the clutch disk and the main shaft of the machine; substantially as described.

50. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein normally spring pressed outwardly toward a position for clutching connection between said members, means under the control of the operator for normally holding said rollers in inoperative position against the spring tension, and operating connections between the clutch disk and the main shaft of the machine; substantially as described.

51. In a machine of the character described, the combination, with a motor and main operating shaft, of a clutch device comprising a driving and a driven member, the driving member comprising a clutch ring rotated by the motor, and the driven member somprising a clutch disk received by such ring and having a series of marginal notches, a series of rollers therein, operating connections between the clutch disk and the main shaft of the machine, and means for controlling said rollers and thereby controlling clutching action and the consequent operation of the machine; substantially as described.

52. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein, operating connections between the clutch disk and the main shaft of the machine, and a series of pins co-operating with the rollers and under the control of the operator, said pins being arranged to prevent clutching action of the rollers; substantially as described.

53. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein, normally tending to form clutch connection between said members, key-operated means for controlling the operation of the rollers and consequently clutching action, and operating connections between the clutch disk and the main shaft of the machine; substantially as described.

54. In a machine of the character described, the combination with a motor and main operating shaft, of a clutch device, comprising a driving and a driven member, the driving member comprising a clutch ring rotated by the motor, and the driven member comprising a clutch disk received by such ring and having a series of marginal notches, a series of rollers therein normally tending to form clutch connection between said members, a series of pins co-operating with the rollers and normally restraining them against clutch action, means under the control of the operator for controlling the operation of the pins, and operating connections between the clutch disk and the main shaft of the machine; substantially as described.

55. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein normally tending to form clutch connection between said members, means co-operating with the rollers and normally restraining their clutch action, a catch controlling said means and arranged to be released at the will of the operator to permit clutch action, and operating connections between the clutch disk and main shaft of the machine; substantially as described.

56. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein normally tending to form clutch connection between said members, means co-operating with the rollers and normally restraining their clutch action, and a key-actuated catch controlling said means and arranged to be released at the will of the operator to permit clutch action, and operating connections between the clutch disk and main shaft of the machine; substantially as described.

57. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein spring pressed toward clutching position, movable means co-operating with the rollers and arranged to hold them in inoperative position against the tension of their springs, a catch controlling said means and adapted to hold the same in position to render the rollers inoperative, a key for operating such catch, and operating connections between the driven member or clutch disk and the main shaft of the machine; substantially as described.

58. In a machine of the character described, the combination, with a motor and main operating shaft, of a clutch device comprising a driving and a driven member, the driving member comprising a clutch ring rotated by the motor, and the driven member comprising a clutch disk received by such ring and having a series of marginal notches, a series of rollers therein, a plate co-operating with such clutch disk and controlling the clutching action of the rollers, an operating shaft connected with the plate, a catch under the control of the operator for normally engaging said plate and thereby preventing clutch action, and operating connections between said operating shaft and the main shaft of the machine; substantially as described.

59. In a machine of the character described, the combination with a motor and main operating shaft, of a clutch device comprising a driving and a driven member, the driving member comprising a clutch ring rotated by the motor, and the driven member comprising a clutch disk received by such ring and having a series of marginal notches, a series of spring pressed rollers therein, a rotatable disk or plate co-operating with the clutching rollers and adapted, when restrained against rotation, to prevent clutch action, means for controlling the rotation of said disk or plate at the will of the operator, and operating connections between said clutch ring and the main shaft of the adding machine; substantially as described.

60. In a machine of the character described, the combination, with a motor and main operating shaft, of a clutch device comprising a driving and a driven member, the driving member comprising a ring rotated by the motor, and the driven member comprising a clutch disk received by such ring and having a series of marginal notches, a series of spring pressed rollers therein, a rotatable plate having a series of pins co-operating with said rolls and adapted, when restrained against rotation, to prevent clutching action, means for controlling the rotation of said plate at the will of the operator, and operating connections between said clutch disk and the main shaft of the adding machine; substantially as described.

61. In a machine of the character described, the combination, with a motor and main operating shaft, of a clutch device comprising a driving and a driven member, the driving member comprising a ring rotated by the motor, and the driven member comprising a clutch disk received by such ring and having a series of marginal notches, a series of spring pressed rollers therein, a rotatable plate co-operating with the rollers and adapted, when restrained against rotation, to prevent clutching action, means under the control of the operator for normally restraining said plate against movement, and operating connections between said clutch disk and the main shaft of the adding machine; substantially as described.

62. In a machine of the character described, the combination with a motor and main operating shaft, of a clutch device comprising a driving and a driven member, the driving member comprising a ring rotated by the motor, and the driven member comprising a clutch disk received by such ring and having a series of marginal notches, a series of spring pressed rollers therein, a rotatable plate co-operating with the rolls and adapted, when restrained against rotation, to prevent clutching action, a projecting arm on said plate, a catch under the control of the operator and normally engaging said arm and restraining its plate against rotation, and operating connections between said adding machine shaft and said clutch disk; substantially as described.

63. In a machine of the character described, the combination, with a motor, of a clutch device co-operating therewith, the operating mechanism of the machine, an operating shaft connected with the driven member of the clutch and operatively connected with the said operating mechanism of the machine, and means for preventing backward rotation of the shaft; substantially as described.

64. In a machine of the character described, the combination, with a motor, of a clutch device co-operating therewith, the operating mechanism of the machine, an operating shaft connected with the driven member of the clutch and operatively connected with the said operating mechanism of the machine, and means for preventing backward rotation of the shaft comprising a cam plate mounted on said shaft, and a locking pawl co-operating with said cam plate to lock the latter against backward rotation; substantially as described.

65. In a machine of the character described, the combination, with a motor, of a clutch device co-operating therewith, the operating mechanism of the machine, an operating shaft connected with the driven member of the clutch and operatively connected with the said operating mechanism of the machine, and means for preventing backward rotation of the shaft comprising a plate mounted on said shaft and provided with a cam edge having an abrupt and substantially radial turn at one point, and a locking pawl co-operating with the edge of the cam plate to prevent backward rotation of the plate and its shaft; substantially as described.

66. In a machine of the character described, the combination, with the totalizing mechanism thereof, of driving mechanism under the control of and rendered operative by said totalizing mechanism; substantially as described.

67. In a machine of the character described, the combination, with the clearing mechanism thereof, of driving mechanism under the control of said clearing mechanism for operating the machine; substantially as described.

68. In a machine of the character described, the combination, with the clearing mechanism thereof, of driving mechanism for operating the machine and arranged to be brought into action by the operator through the medium of said clearing mechanism; substantially as described.

69. In a machine of the character described, the combination, with the totalizing mechanism thereof, of driving mechanism for operating the machine and arranged to be brought into action by the operation of said totalizing mechanism; substantially as described.

70. In a machine of the character described, the combination, with the clearing mechanism thereof, of driving mechanism for operating the machine, and a key for controlling the operation of the clearing mechanism and the driving mechanism; substantially as described.

71. In a machine of the character described, the combination, with the totalizing and clearing mechanism thereof, of driving mechanism for operating the machine and a key for controlling said totalizing and clearing mechanism and the driving mechanism; substantially as described.

72. In a machine of the character described, the combination, with the totalizing mechanism thereof, of driving mechanism for operating the machine, and a key for controlling the totalizing and driving mechanisms, but arranged to operate the totalizing mechanism in advance of the driving mechanism; substantially as described.

73. In a machine of the character described, the combination, with the totalizing mechanism thereof, of driving mechanism for operating the machine, and a key for controlling the totalizing and driving mechanisms, and by whose preliminary depression the totalizing mechanism is brought into operative position and by whose further depression the driving mechanism is caused to operate the machine; substantially as described.

74. In a machine of the character described, the combination, with the printing and totalizing mechanisms thereof, of driving mechanism adapted to operate the machine, and means under the control of the totalizing mechanism for causing said driving mechanism to operate the machine; substantially as described.

75. In a machine of the character described, the combination, with the totalizing mechanism thereof, of driving mechanism adapted to operate the machine, said driving mechanism being under the control of the totalizing mechanism and arranged to operate the machine when the totalizing mechanism is in position for the taking of a total; substantially as described.

76. In a machine of the character described, the combination, with the totalizing mechanism thereof, of driving mechanism adapted to operate the machine, and a total key connected with the totalizing mechanism and operatively connected with the driving mechanism to cause, when operated, an operation of the machine; substantially as described.

77. In a machine of the character described, the combination, with the totalizing mechanism thereof, of driving mechanism adapted to operate the machine, operating means under the control of the operator for controlling the action of the driving mechanism, said driving mechanism being also under the control of the total mechanism; substantially as described.

78. In a machine of the character described, the combination, with the totalizing mechanism thereof, of driving mechanism adapted to operate the machine, means under the control of the operator for directly controlling the driving mechanism, and means for indirectly controlling such driving mechanism through the medium of the totalizing mechanism; substantially as described.

79. In a machine of the character described, the combination, with the clearing mechanism thereof, of driving mechanism adapted to operate the machine, means under the control of the operator for directly controlling the driving mechanism, and means for indirectly controlling such driving mechanism through the medium of the clearing mechanism; substantially as described.

80. In a machine of the character described, the combination, with the totalizing mechanism thereof, of driving mechanism adapted to operate the machine, key mechanism for controlling the action of the driving mechanism, and a key for controlling the totalizing mechanism and operatively connected with said key mechanism; substantially as described.

81. In a machine of the character described, the combination, with the totalizing mechanism thereof, of driving mechanism adapted to operate the machine, key mechanism for controlling the action of the driving mechanism, and means for operating said key mechanism in the act of taking a total; substantially as described.

82. In a machine of the character described, the combination, with the totalizing mechanism thereof, of driving mechanism adapted to operate the machine, a special key for controlling the action of the driving mechanism, and a total key operatively connected with the totalizing mechanism and arranged to control the action of the driving mechanism independently of the special key; substantially as described.

83. In a machine of the character described, the combination, with the totalizing mechanism thereof, of a motor and a clutch operatively connected with the motor and the machine, said clutch being under the control of the totalizing mechanism and adapted to be actuated thereby to operate the machine in the act of taking a total; substantially as described.

84. In a machine of the character described, the combination, with the totalizing mechanism thereof, of a motor, a clutch operatively connected with the motor and the machine, and a key for controlling the action of the clutch which is also under the control of the totalizing mechanism independently of said key; substantially as described.

85. In a machine of the character described, the combination, with the clearing mechanism thereof, of a motor and a clutch operatively connected with the motor and the machine, said clutch being under the control of the clearing mechanism and adapted to be actuated thereby to operate the machine in the act of clearing the machine; substantially as described.

86. In a machine of the character described, the combination, with the clearing mechanism thereof, of a motor, a clutch operatively connected with the motor and the machine, and a key for directly controlling the action of the clutch, said clutch being also under the control of the clearing mechanism and operated thereby whenever such latter mechanism is operated; substantially as described.

87. In a machine of the character described, the combination, with the totalizing mechanism thereof, of a motor, a clutch operatively connected with the motor and with the machine, operating connections between the totalizing mechanism and the clutch adapted to actuate the latter whenever the totalizing mechanism is operated, and means for restraining action of such operating connections until the totalizing mechanism is in position ready to take the total; substantially as described.

88. In a machine of the character described, the combination, with the totalizing mechanism thereof, of a motor, a clutch operatively connected with the motor and with the machine, a rod or stem for controlling the clutch, said stem being under the control of the operator and operated directly by him in the ordinary operations of the machine, and operating connections between said totalizing mechanism and the stem for actuating the latter, in the operation of taking a total; substantially as described.

89. In a machine of the character described, the combination, with the clearing mechanism thereof, of a motor, a clutch operatively connected with the motor and with the machine, an operating bar or stem for controlling the clutch, said stem being under the control of the operator and directly operated by him in the ordinary operations of the machine, and operating connections between said clearing mechanism and the stem for actuating the latter in the act of clearing the machine; substantially as described.

90. In a machine of the character described, the combination, with the totalizing mechanism thereof, of a motor, a clutch operatively connected with the motor and with the machine, a rod or stem for controlling the clutch, said stem being under the control of the operator and operated directly by him in the ordinary operations of the machine, and a swinging member operatively connected with said rod or stem and under the control of the totalizing mechanism for operating said stem and thereby operating the machine in the operation of taking a total; substantially as described.

91. In a machine of the character described, the combination, with the totalizing mechanism thereof, of a motor, a clutch operatively connected with the motor and with the machine, a rod or stem for controlling the clutch, said stem being under the control of the operator and operated directly by him in the ordinary operations of the machine, a swinging member arranged to be swung by the totalizing mechanism, and a pawl pivoted on such member and arranged to engage and operate the rod or stem when the totalizing mechanism is operated; substantially as described.

92. In a machine of the character described, the combination, with the totalizing mechanism thereof, of a motor, a clutch operatively connected with the motor and with the machine, a rod or stem for controlling the clutch, said stem being under the control of the operator and operated directly by him in the ordinary operations of the machine, and a bell-crank having a pawl on one arm and rocked by the totalizing mechanism, said pawl being arranged to engage and operate the rod or stem whenever the totalizing mechanism is operated and the bell-crank thereby rocked; substantially as described.

93. In a machine of the character described, the combination, with the totalizing mechanism thereof, of a motor, a clutch operatively connected with the motor and with the machine, a rod or stem for controlling the clutch, said stem being under the control of the operator and operated directly by him in the ordinary operations of the machine, a bell-crank having a pawl on one arm and rocked by the totalizing mechanism, said pawl being arranged to engage and operate said stem whenever the totalizing mechanism is operated and the bell-crank thereby rocked, and means for limiting the movement of the pawl with respect to the bell-crank; substantially as described.

94. In a machine of the character described, the combination, with the totalizing mechanism thereof, of a motor, a clutch operatively connected with the motor and with the machine, a rod or stem for controlling the clutch, said stem being under the control of the operator and operated directly by him in the ordinary operations of the machine, a bell-crank having a pawl on one arm and rocked by the totalizing mechanism, said pawl being arranged to engage and operate said stem whenever the totalizing mechanism is operated and the bell-crank thereby rocked, said pawl being spring pressed towards a position of engagement with the stem, and a pin on the pawl for contacting the bell-crank to thereby limit the movement of the pawl relatively to the bell-crank; substantially as described.

95. In a machine of the character described, the combination, with the totalizing mechanism thereof, of a motor, a clutch operatively connected with the motor and with the machine, an operating stem controlling the clutch, a swinging arm actuated by the totalizing mechanism, a bell-crank connected with and operated by the arm with a yielding pressure, and a pawl pivoted on the bell-crank and arranged to engage and operate the stem when the totalizing mechanism is operated; substantially as described.

96. In a machine of the character described, the combination, with the totalizing mechanism thereof, of a motor, a clutch operatively connected with the motor and with the machine, an operating stem controlling the clutch, a swinging arm actuated by the totalizing mechanism, a bell-crank connected with and operated by the arm, and a pawl pivoted on the bell-crank, said stem having a notch with which the pawl co-operates to operate the stem in the act of taking a total; substantially as described.

97. In a machine of the character described, the combination, with the totalizing mechanism thereof, of a motor, a clutch operatively connected with the motor and with the machine, an operating stem controlling the clutch, a swinging arm actuated by the totalizing mechanism and provided with a stop pin, a bell-crank operatively connected with the arm by means of a spring and normally held against said stop pin, and a pawl pivoted on the bell-crank and adapted to engage the stem to operate the latter whenever the totalizing mechanism is operated; substantially as described.

98. In a machine of the character described, the combination, with the totalizing mechanism thereof, of a motor, a clutch operatively connected with the motor and with the machine, a stem for controlling said clutch, operating connections between the totalizing mechanism and said stem, and means for restraining the actuation of the stem by the operating connections until the totalizing mechanism has been properly positioned for the taking of a total; substantially as described.

99. In a machine of the character described, the combination, with the clearing mechanism thereof, of a motor, a clutch operatively connected with the motor and with the machine, an operating stem for controlling the clutch, operating connections between the clearing mechanism and said stem, and means for restraining the actuation of the stem by the operating connections until the clearing mechanism has been properly positioned for clearing the machine; substantially as described.

100. In a machine of the character described, the combination, with the totalizing mechanism thereof, of a motor, a clutch operatively connected with the motor and with the machine, a stem controlling said clutch, operating connections between the totalizing mechanism and said stem, and means for restraining the actuation of the stem by the operating connections until the totalizing mechanism has been properly positioned for the taking of a total, comprising an interference controlled by the totalizing mechanism and moved into the path of movement of said stem during the initial operation of such latter mechanism; substantially as described.

101. In a machine of the character described, the combination, with the totalizing mechanism thereof, of a motor, a clutch operatively connected with the motor and with the machine, a key stem for controlling the clutch and under the control of the operator and operated directly by him in the ordinary operations of the machine, operating connections between the totalizing mechanism and the stem for actuating the latter in the operation of taking a total, and means for restraining the movement of the stem until the totalizing mechanism is positioned ready for the taking of a total; substantially as described.

102. In a machine of the character described, the combination, with the totalizing mechanism thereof, of a motor, a clutch operatively connected with the motor and with the machine, a stem for controlling said clutch, a swinging arm actuated by the totalizing mechanism, a bell-crank arranged to be operatively connected with said arm and with said stem, and means for restraining the actuation of the stem by the bell-crank until the totalizing mechanism has been properly positioned for the taking of a total; substantially as described.

103. In a machine of the character described, the combination, with the totalizing mechanism thereof, of a motor, a clutch operatively connected with the motor and with the machine, a stem for controlling said clutch, a bell-crank operatively connected with the totalizing mechanism and with said stem, and a member arranged to be moved longitudinally by the totalizing mechanism and provided with an interference adapted to engage said stem and to hold the latter against the pressure exerted by the bell-crank during the initial movement of said member; substantially as described.

104. In a machine of the character described, the combination, with the totalizing mechanism thereof, of a motor, a clutch operatively connected with the motor and with the machine, a stem for controlling said clutch, and having a projection on one side, a bell-crank operatively connected with the totalizing mechanism and with the stem, and a link or bar movable longitudinally by the totalizing mechanism and provided with a projection arranged to be brought into interference with the projection on said stem and prevent the latter's operation during the initial movement of the link or bar; substantially as described.

JESSE G. VINCENT.

Witnesses:
LOUIS B. ERWIN.
S. E. HIBBEN.

---

It is hereby certified that in Letters Patent No. 858,548, granted July 2, 1907, upon the application of Jesse G. Vincent, of Detroit, Michigan, for an improvement in "Adding-Machines," an error appears in the printed specification requiring correction, as follows: Page 10, line 60, the words "printing and" should be stricken out; and that the said Letters Patent should be read with this correction therein that the same may conform to the record of the case in the Patent Office.

Signed and sealed this 20th day of August, A. D., 1907.

[SEAL.]

C. C. BILLINGS,

*Acting Commissioner of Patents.*